Patented Apr. 17, 1951

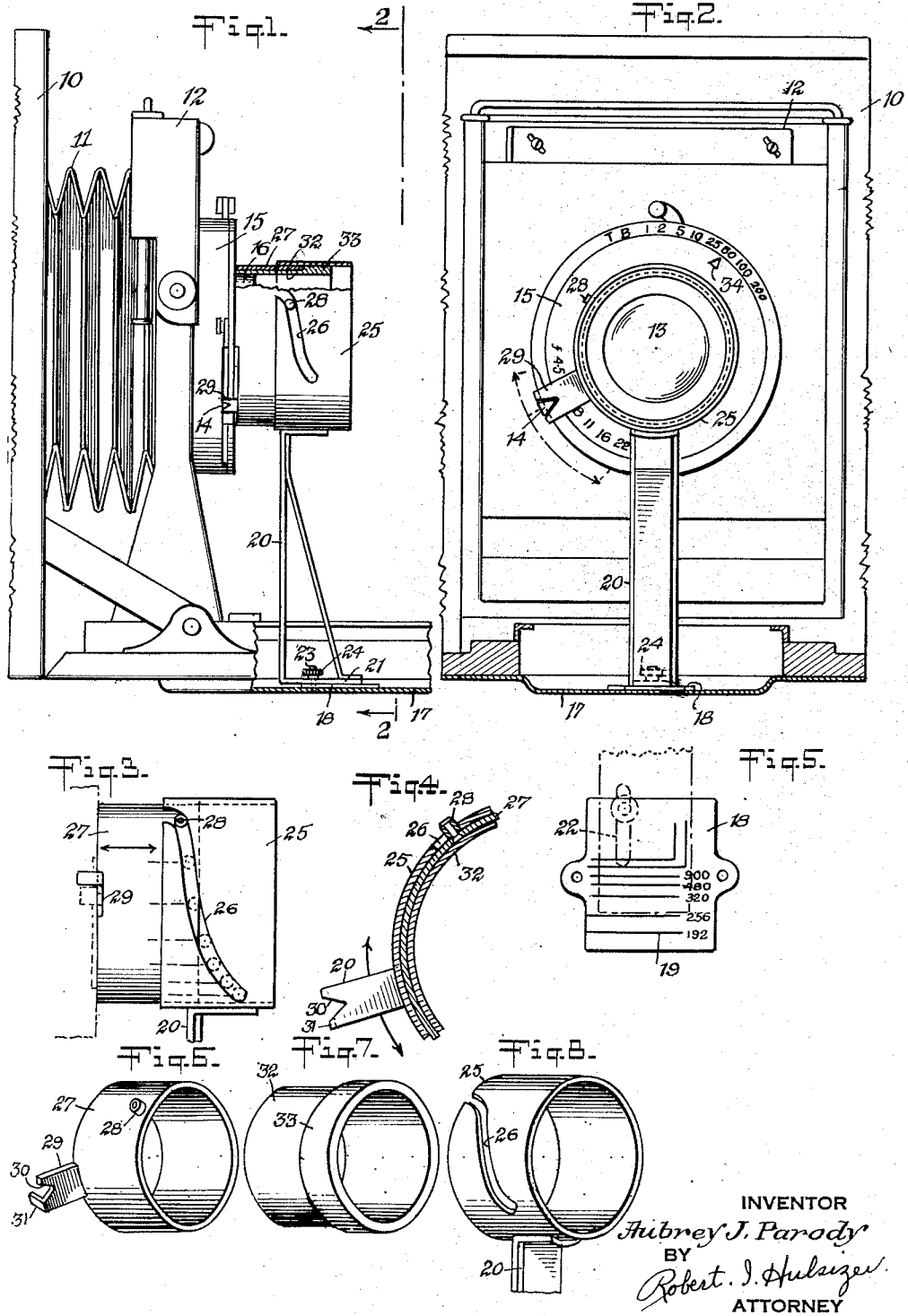

2,549,230

UNITED STATES PATENT OFFICE 2,549,230

DEVICE FOR AUTOMATICALLY ADJUSTING THE DIAPHRAGM OPENINGS OF CAMERAS

Aubrey J. Parody, Astoria, N. Y.

Application December 30, 1947, Serial No. 794,470

1 Claim. (Cl. 95—64)

This invention relates to new and useful improvements in means for automatically adjusting the diaphragm aperture of focusing cameras.

Heretofore when a press photographer or commercial photographer is assigned to take pictures of events and people and he has to act quickly to catch the pose or action, it is desirable that he be required to effect the fewest possible adjustments of the camera at that time. It is, therefore, the main object of this invention to reduce the number of required manipulations on the part of the operator during the taking of the pictures to a minimum.

Because cameras, especially those used by the above types of operators may be also used in many other circumstances, it is also desirable that the adjusting means employed under one set of conditions can be easily attached to the camera and removed therefrom when the camera is to be operated under other conditions. It is another object of the invention, therefore, to provide a simple combination of means which can be readily applied to and removed from the camera.

Because in use by press and commercial photographers cameras are under constant manipulation and do not necessarily always receive gentle handling, it is highly desirable that the improved adjusting elements be related to each other and to the camera so as to withstand rugged treatment without impairing their function, and it is, therefore, another object of the invention to provide a simple, efficient, strong, and durable combination of elements which will function accurately even under such treatment.

Since the cameras under consideration may be used for a variety of purposes, it is desirable that any combination of elements associated therewith to achieve the novel results of the invention do not require any change whatever in the structure of the camera and it is, therefore, still another object of the invention to provide a novel combination of elements which can be associated quickly and easily with a camera without in any way changing its construction and operation.

Further and more specific objects, features and advantages will more clearly appear from a consideration of the detailed specification hereinafter set forth, especially when taken in connection with the accompanying drawings which illustrate a present preferred form which the invention may assume and which form part of the specification.

When a press or commercial photographer goes out on an assignment, he generally knows the "lumen" of his flashbulb, the speed of his film, and has already decided on the shutter speed to use. With these three elements determined in advance, tables provided by the various film and camera companies enable him to determine a factor number for these three elements. With this factor number in mind and in accordance with this invention, it is merely necessary for him to adjust a control member in a proper position longitudinally with respect to the lens axis in accordance with this factor number and then physically associate a rotatable element operated by said control element with the shutter-operating finger whereby the only action required of the operator after these adjustments are made is to focus his camera on the object to be photographed during which time the diaphragm aperture is automatically adjusted.

Generally speaking, the control member may comprise a sleeve having a curved slot therein, the curvature of which is vectorially calculated with relation to the values of the diaphragm openings and the object distance. This control member is positioned along the lens axis at a point determined by the value of the above-mentioned factor.

Mounted on the lens ring or housing is a sleeve rotatable thereon and having a pin lying in said slot. This rotatable sleeve has a projection which engages the diaphragm-operating finger or element. As the lens head in the usual manner of focusing is advanced or retracted, the pin in the slot is moved up or down therein and in so doing turns the rotary collar whereby the diaphragm-operating element is turned automatically to set the diaphragm for the proper opening dependent upon the distance of the object. In other words, all the operator has to do after the novel adjusting elements are set in position on the camera is to focus on his object and take the picture.

The present preferred form of the invention is shown in the drawings of which—

Fig. 1 is a side elevation of a camera with the novel device attached thereto with certain parts shown in section;

Fig. 2 is a vertical cross section taken on the line 2—2 of Fig. 1;

Fig. 3 is an enlarged side elevation of the novel attachment showing the cooperating sleeves;

Fig. 4 is an enlarged partial cross section taken through the sleeves;

Fig. 5 is a plan view of a scale plate attached to the base of the camera for setting the attachment with respect to the longitudinal axis of the lens;

Figs. 6, 7 and 8 taken together are perspective views of the cooperating sleeve elements shown in the other figures.

Referring now merely to the specific form of the invention shown on the drawings, it is seen that the camera has a body portion 10, an expansible bellows 11 and the usual frame 12 at the front end of the bellows and containing a lens 13 and a diaphragm element, not shown, but which is adjustable by means of the movement of a finger 14 around the periphery of the diaphragm casing 15. The lens is suitably supported as usual in its own housing 16 which extends forwardly from the diaphragm housing 15.

The lens 13 and its associated parts are moved back and forth in the usual manner in order to properly focus the lens by any suitable means, not shown. The camera is provided with the usual hinged base plate 17 along which the frame 12 is moved when the camera is opened. On the upper face of this base plate 17 is fixed a scale plate 18 having graduations 19 thereon spaced from each other distances relatively the same as the well-known focusing lines used to focus the lens. However, these lines 19 instead of being nominated in terms of the distance of an object away from the lens are graduated in terms of determined numbers or factors as previously explained. These factor numbers are calculated in terms of three values: first, the "lumen" of the flashbulb; second, the speed of the film being used; and third, the shutter speed to be employed.

A suitable pedestal or bracket member 20 has a bottom plate 21 provided with a longitudinal slot 22 to permit the bracket to be adjusted axially of the lens 13 and with regard to the factor lines 19. In this case the forward edge of the base plate 21 is used as the determining edge for positioning of the brackets. A suitable pin 23 fastened to the base plate 17 extends up through the slot 22 and has a nut 24 thereon to tighten the bracket in a set position.

Supported on top of the bracket 20 is a control sleeve 25, the wall of which is provided with a slot 26 of predetermined curvature and opening into the rear wall of the sleeve. This curve, as mentioned above, is calculated by plotting ordinates and abscissae in terms respectively of diaphragm opening values and object distances. It is to be observed that this control sleeve 25 and its calculated slot being mounted on bracket 20 are intended to be fixed in any adjusted position on the base plate 17. Cooperating with this control sleeve is a rotatable collar 27. This collar has a projecting pin 28 on its periphery near the forward edge thereof and this pin is adapted to lie in the slot 26. This rotatable collar on its rear edge is provided with a laterally projecting finger 29 having a slot 30 in its forward end and a turned over lip 31. This finger is adapted by means of the slot 30 to embrace the diaphragm-operating finger or element 14 previously mentioned so that as the collar 27 is rotated, the diaphragm-operating element 14 is moved and set in the desired position.

The collar 27 is mounted rotatably on a sleeve 32 which is tight fitted over the edge of the lens casing 16. The forward end of the sleeve 32 is thickened as at 33 to provide a shoulder against which the forward edge of the collar 27 lies. This construction will permit the collar 27 to be advanced into the control sleeve 25 as shown in Fig. 1, but the shoulder 33 will effect the withdrawal of the collar from said control sleeve when the frame 12 is moved backward. It is to be noted that the outer diameters of the collar 27 in the thickened portion 33 of the sleeve 32 are of such a value as to permit them to slide easily within the control sleeve 25.

In the operation of the device with a special reference to people who are going out to take commercial photographs or news photographs where the action is rapid and the adjustment of the camera in the taking of the picture must be effected in matter of a few seconds, it is obviously desirable to have as many of the necessary factors concerned in the operation, already adjusted in advance so that a minimum of adjustment is required of the operator as and when the picture is to be taken. Consequently, when the average news photographer leaves the office, he knows the speed of his film; he knows the "lumen" power of his flashbulb; and he knows the shutter speed he desires to use. These three values being known in advance enable him from well-known tables supplied by the film companies to determine his so-called "factor number." This number is found on his scale plate 18 so that he opens his camera before leaving the office to dispose the base plate 17 in horizontal position and then places his sleeve 32 with the collar 27 on the lens casing 16 with the finger 29 engaging the diaphragm-operating element 14, and then adjust the control sleeve 25 on the plate 17 in a longitudinal position determined by the factor number thus found. The parts are so related that when the element 14 is in wide open position such as F 4.5, pin 28 will lie in the upper part of the slot as shown in Fig. 3. His shutter speed adjusting element 34 is already set at the selected speed position.

With the parts thus adjusted, now all the operator has to do to take a picture is to move the frame 12 back and forth in the usual manner to focus on the object and then press his flash switch and take his picture. What happens when he focuses the parts back and forth is that the pin 28 will ride up or down in the slot 26 and in so doing will rotate the collar 27 to adjust the diaphragm opening in accordance with the positioning of the lens along its longitudinal axis. The lip 31 and the slot 30 respectively embracing the periphery of the diaphragm housing 15 and the finger element 14 will insure their proper relation during this rotary movement of the collar. It is obvious that it is only a matter of a few seconds to either assemble or disassemble these parts so that when the camera is to be used under conditions where this adjusting element is not required, it can readily be taken off without any loss of time and without any great effort.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of the appended claim.

I claim:

An adjusting device for cameras having a lens housing, a base plate and a diaphragm-operating element which comprises a control sleeve disposed in axial alignment with the lens; a curved slot on the periphery of said control sleeve, the curvature of which is determined in terms of the relation between diaphragm openings and object distances, a bracket supporting said control sleeve, means for adjusting said bracket on the base plate, a gage plate on the base plate in association with said bracket, said gage plate numerated in terms of factors, the values of which depend upon bulb "lumen," shutter speed and film speed, a fixed sleeve disposed on the lens housing and having a shouldered forward end, a rotatable collar on the fixed sleeve and limited in axial movement by said shoulder, a pin on said rotatable collar adapted to lie in the slot in the control sleeve, a finger on said rotatable collar having a slotted end to embrace the diaphragm-operating element, the normal focusing of the lens and its movement along its axis causing the pin to move in the slot and rotate the collar to automatically adjust the diaphragm-operating element in a position related to the amount of movement of the lens.

AUBREY J. PARODY.

REFERENCES CITED

The following references are of record in the file of this patent:

UNITED STATES PATENTS

| Number | Name | Date |
| --- | --- | --- |
| 212,099 | Knapp | Feb. 11, 1879 |
| 1,262,347 | Ide | Apr. 9, 1918 |
| 1,546,060 | Carmine | July 14, 1925 |
| 1,720,224 | Lessler et al. | July 9, 1929 |
| 2,334,075 | Davenport | Nov. 9, 1943 |
| 2,351,834 | Phillips | June 20, 1944 |
| 2,369,199 | Aiken | Feb. 13, 1945 |